United States Patent [19]
Smoot

[11] Patent Number: 6,160,667
[45] Date of Patent: Dec. 12, 2000

[54] APPARATUS AND METHOD FOR CREATING AND DISPLAYING PLANAR VIRTUAL IMAGES

[75] Inventor: Lanny S. Smoot, West Hampton, N.Y.

[73] Assignee: Telcordia Technologies, Inc., Morristown, N.J.

[21] Appl. No.: 09/131,962

[22] Filed: Aug. 11, 1998

Related U.S. Application Data

[60] Provisional application No. 60/055,448, Aug. 11, 1997.

[51] Int. Cl.[7] .................................................. G02B 27/14
[52] U.S. Cl. .......................... 359/630; 359/619; 359/569; 349/13; 385/115; 385/121; 345/7; 345/8
[58] Field of Search ..................................... 359/630, 619, 359/618, 569, 631; 349/8, 11, 13; 345/7, 8; 385/115, 116, 121

[56] References Cited

U.S. PATENT DOCUMENTS

| | | | |
|---|---|---|---|
| 5,499,138 | 3/1996 | Iba | 359/569 |
| 5,596,339 | 1/1997 | Furness, III et al. | 345/8 |
| 5,601,352 | 2/1997 | Okamura | 359/630 |
| 5,751,383 | 5/1998 | Yamanaka | 349/13 |
| 5,808,589 | 9/1998 | Fergason | 345/8 |
| 5,812,224 | 9/1998 | Maeda et al. | 349/13 |
| 5,883,606 | 3/1999 | Smoot | 345/7 |

*Primary Examiner*—Loha Ben
*Attorney, Agent, or Firm*—Joseph Giordano

[57] ABSTRACT

A method and system for creating very thin displays producing virtual images based on extremely small "pinpoint" light sources. In an embodiment, a pinpoint light source is used in a manner analogous to a pinhole lens to magnify and view a displayed image up close. In another embodiment, an array of pinpoint light sources with or without intervening lenses is used to illuminate a spatial light modulator to produce an extremely thin virtual image display.

14 Claims, 7 Drawing Sheets

APPARATUS AND METHOD FOR CREATING AND DISPLAYING PLANAR VIRTUAL IMAGES

CROSS REFERENCE TO RELATED APPLICATIONS

This application claims the benefit of U.S. Provisional Application No. 60/055,448 filed on Aug. 11, 1997 and entitled "Planar Virtual Imaging Displays."

FIELD OF THE INVENTION

This invention relates to creating immersive view displays and specifically to creating an immersive view display that is viewable at close distances by the eye.

BACKGROUND OF THE INVENTION

There have been several approaches to creating displays for "immersive viewing" (that is, where the user is completely surrounded by visual imagery created by electronic or other means), especially those supporting virtual reality environments. In these applications, the idea is to provide a viewing device, usually in the form of a head-mounted, or face mounted display system worn like a pair of goggles, that will produce an image which is viewable at close distances from each eye, and where the image produced appears to be large and at virtual infinity so that the eyes can focus on it.

Figure 1:
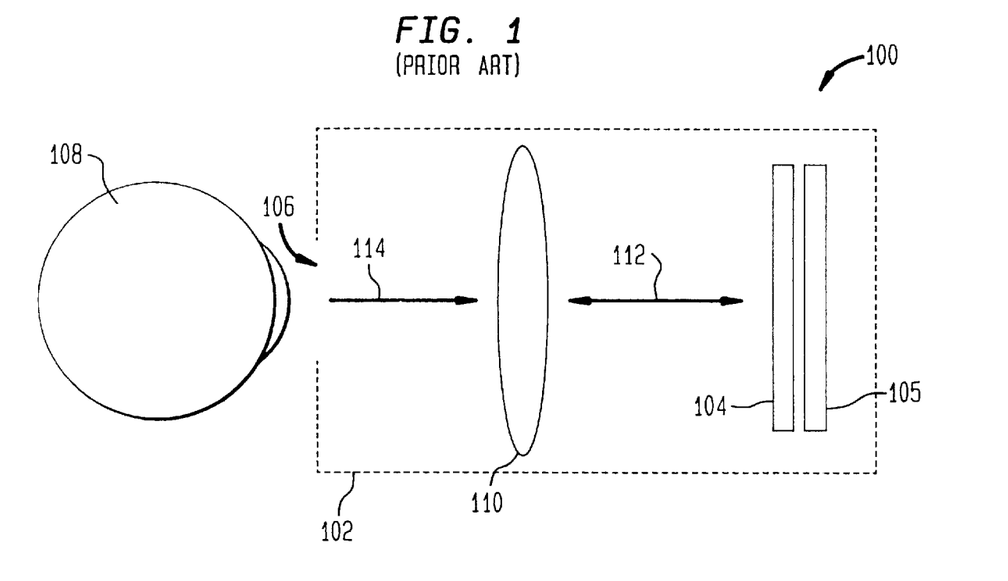
FIG. 1 illustratively depicts a prior art virtual reality display using a planar display and a lens system.

Almost all attempts at virtual reality displays have used a planar display of some kind (usually a flat-panel liquid crystal display) and a lens system. FIG. 1 illustrates such a system 100. A housing 102 contains at one end a Liquid Crystal Spatial Light Modulator (LC SLM) 104 and a diffuse backlight 105. At the other end is an aperture 106 through which a user's eye 108 may look into the system. Interposed between the aperture 106 and the LC SLM 104 is bulk optics 110 (represented in FIG. 1 by a double convex lens element) for focusing the LC SLM 104 image onto the eye. Note that in order for the image from the SLM to focus properly on the user's eye 108, there is a first length 112, which is substantially a first focal length of lens 110 between the LC SLM 104 and the optics 110, and a second length 114, which is substantially a second focal length between the optics 110 and the aperture 106. There are many variations on this structure, but each attempts to portray a magnified image for each of the user's eyes that appears to be placed at, or near, virtual infinity so that the eye can easily focus on it.

The resulting head-mounted displays are physically large due to (1) thick, low f-number, display-sized lenses used in lens system 110 and (2) the long optical path lengths required for these lenses. The displays are also heavy, due to the weight of the glass or plastic comprising the optics, and uncomfortable to wear because this large and heavy display/lens-system is cantilevered out over the front of the head and tends to tilt the wearer's head forward.

In more advanced head-mounted displays (e.g., those used in military aircrafts), the image is often relayed by a series of mirrors and/or intermediate lenses, or even coherent bundles of optical fiber, from a display that is remote from the eye. In these cases, one or more bulk lenses (or mirrors) are again used at the end of the optical relay system closest to the user's eye to create an image that appears to be at virtual infinity. Some displays use a semi-transparent visor as part of the virtual imaging system and cause the ultimate virtual image to be displayed by way of partial reflection. Again, focal lengths on the order of several inches and large reflecting surfaces make these systems cumbersome and bulky.

Techniques such as described in Hildebrandt, et. al., Apr. 29, 1997, U.S. Pat. No. 5,625,372, attempt to decrease the overall size of the device while still using bulk optics by using a folded optical path. These techniques, however, are unlikely to be able to produce a truly planar device since they still employ bulk optics with focal lengths measured as a large fraction of the diameter of the optics.

The size of these prior art display systems also rules out their use in applications requiring small or flat displays such as in SmartCards.

Reflection Technology Inc., of Waltham, Mass., provides a head-mounted display called "Private Eye". This head mounted display uses a linear array of LEDs to create the image. The image of the LEDs is swept back and forth through a fixed angle by a vibrating mirror. The swept image is viewed through one or more bulk optics lenses. (This technology is used, for example, in Sega's "Virtual Boy" product). Although the technique eliminates the 2-dimensional Spatial Light Modulator, it still uses bulk optics and results in a display that protrudes from the face much more than an ordinary pair of spectacles, and its non-planarity rules it out for use in places where flat virtual imaging displays are needed.

A head-mounted display developed at the University of Washington at Seattle, uses a laser beam to scan directly into the eye and "paint" an image on the retina. This technique could lead to a less bulky display, but requires a rather sophisticated scanning system and multi-colored lasers for a color image and in any event would not result in a planar display. This device is difficult and expensive to implement.

More recently, techniques such as that described in my U.S. patent application Ser. No. 08/767,751, filed Dec. 17, 1996, now U.S. Pat. No. 5,883,606, issued Mar. 16, 1999, provide a planar display by using microlens arrays and an array of apertures to mask each pixel of a liquid crystal (or other Spatial Light Modulator) such that light from each pixel is directly imaged on the retina thus forming a visible image at virtual infinity.

A drawback with this technique is the relatively fine manufacturing techniques required to create microlens arrays and aperture plates wherein each microlens is precisely aligned with a pixel and aperture plate element.

The purpose of this invention is to overcome the problems of the prior art, and specifically to create a family of displays that are:

Essentially planar, or which have thinner cross-section than other available virtual displays;

Simple and low-cost to manufacture since in at least one embodiment there are no lenses or other traditional active optical element and each pinpoint light source (depending on simple design tradeoffs) can illuminate several tens, hundreds, or even thousands of pixels; and Can be made extremely bright since the pinpoints of light can be delivered from the sheared ends of optical fibers carrying as much light as required, with this light coming, for instance, from a small incandescent light bulb.

SUMMARY OF THE INVENTION

My invention provides a system and method for creating and displaying an image of an object that would normally be out of focus because the image is within the minimum focusing distance of a human eye. In accordance with my invention, a light source illuminates a Spatial Light Modulator (SLM) so that a single ray of light transmits each pixel point on the image through the SLM where each ray is modulated by the SLM. By my invention the eye is able to focus on the image, although the image is within the minimum focusing distance of the eye, because each image point is transmitted to the SLM only by a single ray of light. By using my invention, the eye is able to view in-focus images that are nominally too close for the eye's lens system to sufficiently converge so as to bring multi-angled rays from object points to the analogous image points in the focal plane.

In one illustrative embodiment of my invention, a pinpoint light source is used to illuminate a SLM such as a photographic slide or a liquid crystal display. In this case, the pinpoint light source can be viewed through the actual (transmissive) SLM, although techniques based on reflection are possible. Illumination by such a small source means that only a single ray of light (generated at the pinpoint source, traveling through a single point on the modulator, entering the cornea, pupil, iris, and lens of the eye) illuminates a single point on the retina. Thus, in a manner analogous to a pinhole camera, an in-focus image of the SLM is painted onto the retina and creates an image. Since imaging in this manner is done at close range and does not rely completely on the focusing power of the cornea and lens of the eye, images formed on the retina are not optically inverted (as is the normal case with unaided vision of real-world objects). Since the human brain expects real-world objects to appear upside down on the retina in order to create a brain image that is right-side up, images viewed with this system will appear inverted as compared to viewing them directly on the SLM (by the unaided eye at a distance where the eye can focus on the SLM directly). In this case a pre-inversion can be accomplished on the SLM image. In the electronic domain and in the case of a video SLM, this can be accomplished by use of a video frame store.

In another embodiment of my invention, an array of pinpoint light sources is used to rear-illuminate a larger SLM with each pinpoint light source illuminating a section of the SLM. This technique has the advantage that the angle subtended at the eye by the display can be increased, providing a wider angle of view. Analogous to the single pinpoint light source case, the ray bundles emanating from the light sources can be viewed through the SLM. An intervening square aperture plate (between the pinpoint sources and the SLM) can be used to shape the ray bundles leaving the array of pinpoint light sources so that they have edges that are more easily abutted to provide an integrated overall image.

In this case of multiple pinpoint light-sources illuminating an SLM, the sub-images produced by each segment of the SLM must be individually inverted, and transposed about the vertical and horizontal axis of the overall display. This can be accomplished in several ways including by the use of video signal processors, or by the design or interconnection of a special display.

In yet another embodiment of my invention, a lens array is interposed between an array of pinpoint light sources and an SLM. In this case, the individual lenses in the array generate converging light rays that can again rear illuminate the SLM. The image formed on the retina by this system is upright and needs no special processing before display.

BRIEF DESCRIPTION OF THE DRAWINGS

These and other advantageous features of our invention can be understood from the following detailed description together with the accompanying drawings, in which.

DETAILED DESCRIPTION

Figure 2:
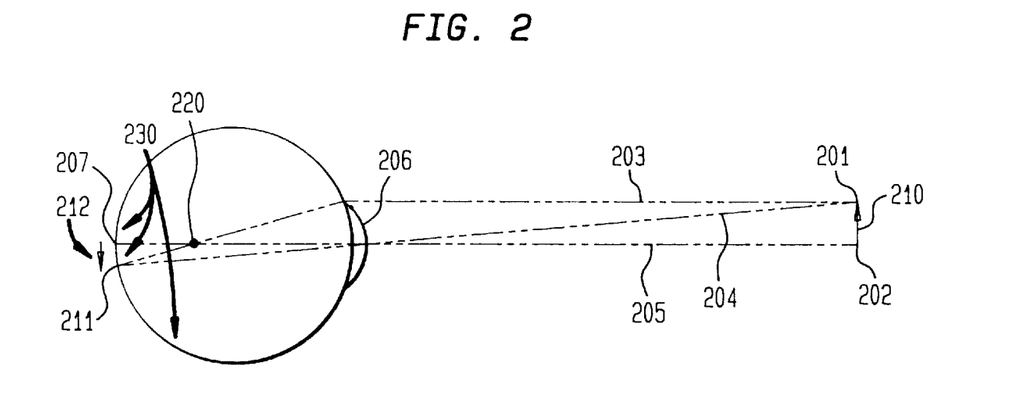
FIG. 2 depicts a cross section of the human eye observing an object.

To better understand the operation of my invention, it is worthwhile to review the process by which the human eye creates images of real world objects. FIG. 2 shows a cross section of the human eye observing an object 210 whose base is on an axis with the center of the cornea/lens 206. It is assumed that object 210 has been brought into focus by the cornea/lens system 206. Since the object is assumed to be in focus, one can determine the nature of the image created on the retina 230 using geometric optics. It can be seen that a paraxial optical ray 203 from the top of object 210 will pass through the eye's back focal point 220 to form a point image 211 at the eye's focal plane (which is at the surface of the retina 230). A ray 204 leaving the top of the object 201 and passing through the center of the eye's lens system will pass through unaffected and again, fall at point 211 on the retina. Finally, a ray of light 205 leaving object 210 from its base 202 and passing through the center of the cornea/lens system 206 will continue to lie on the axis 207. Intermediate points on object 210 will be imaged on the retina at intermittent points and will form an in focus image 212.

Note that the very definition of the object being in focus means that the rays described, especially for example the rays 203 and 204 leaving the same point 201 on the object 210 in different directions, will exactly coincide at image point 211; this will be true, if and only if, the object is in focus. An issue with the lens of the eye is that its limited focusing power will not allow it to cause this convergence of light rays leaving object points in all directions (while still striking the lens) when an object is closer than the eye's minimal focal distance. This minimum focusing distance may be approximately 8 to 10 inches for a middle-aged adult. If an object is placed closer than this minimum distance from the eye, multiple light rays from the same point on the object (e.g., point 201 on object 210) will not land on the same image point 211 on the retina. Indeed, one could say that no true image will be formed, rather, a jumble of rays will create an out-of-focus blur on the retina.

Also note that image 212 is inverted compared to real world object 210. The human brain however will right the image for the user, presenting a mental picture that is an accurate representation of the real world object.

My invention allows the eye to create an in-focus image of objects that are nominally too close for the eye's lens to provide sufficient convergence to bring multi-angled rays from object points to the analogous image points in its focal plane. My invention allows the eye to focus on images within the minimum focusing distance by using special point light sources that allow only a single ray of light to be transmitted by each point of an image. Furthermore, these single rays travel in a collimated bundle. In this manner, when the rays encounter a Spatial Light Modulator (SLM) the rays are individually modulated and continue on in bundle format. As such, the eye's lens system is not required to focus in the traditional sense to image the modulated rays, rather simply to pass this projection, or shadow of the SLM modulation, without distortion, to the retina.

Figure 3:
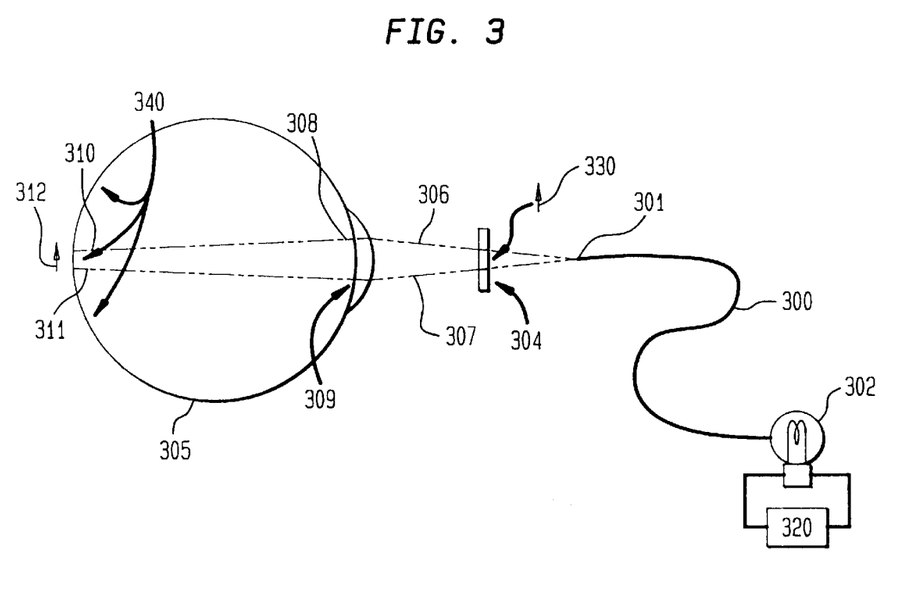
FIG. 3 depicts a single point or pinpoint light source in accordance with an aspect of the present invention.

FIG. 3 shows a single point light source imager in accordance with my invention. In this case, the single point light source is illustratively formed by illuminating one end of fiber 300 with a bright light source 302 (e.g., an incandescent lamp) powered by power source 320. The light emitting from the other end 301 of the optical fiber 300 then forms a single point or pinpoint light source. Fiber 300 can be virtually any type of optical fiber with the only constraints being that it is capable of carrying sufficient light from the ultimate light source, and that its emitting end 301 be of small diameter as compared to the area of the object to be imaged, hence the terminology pinpoint light source. Various plastic or glass fibers used for optical communications are suitable.

In operation, spatial light modulator (SLM) 304, displaying an image of an upright arrow 330, is interposed between fiber-end 301 and eye 305. A topmost ray 306 leaving the pinpoint light source passes through the top of the SLM-displayed arrow and enters the eye just grazing the upper edge of the eye's iris 308. This light ray 306 lands on the retina 340 at an upper point 310. Similarly, a second ray 307 leaving the fiber end 301 and passing through a lower-most portion of the SLM-displayed arrow 330 enters a lower part of the eye's lens and grazes the lower edge of the eye's iris at point 309, and forms a lower image spot 311 on the retina 340. The aggregate of these two spots, and all of the intervening points of light from arrow-image 330 landing on the retina, form arrow image 312 on retina surface 340. Note that the pinpoint light source 301 is too close to the eye to form a point image on the retina 340, i.e., the pinpoint light source is not in focus, and indeed SLM 304 is too close to the eye for the eye to focus normally. Rather, because the pinpoint light source emits a bundle of rays in which each ray is moving in a single direction and is modulated by SLM 304, the eye merely passes this ray bundle to the retina to create a useable image. Furthermore, the image 312 will appear "in-focus" over extremely short distances, i.e., distances that are less than the minimal focusing distance of the eye. Indeed, it is possible to place the SLM extremely close to the cornea, even onto the surface of the eye, and the eye will still perceive an in-focus image.

Note that if SLM 304 displays an image of an upright vertical arrow 330, the image 312 formed on the retina will also be upright since there is a one-to-one, non-inverted correspondence between image points on the SLM and image points on the retina. Since the image 312 painted on the retina is not inverted (as would be the case with real-world objects seen by the eye), the brain will interpret the image as being upside down.

Note also that although FIG. 3 illustrates and depicts rear illumination of the SLM by the pinpoint light source, a reflective SLM could be illuminated by the pinpoint light source to create a virtual image in reflected light.

The single point or pinpoint light source imaging technique is very useful in the case of a small SLM, or where only a fraction of a larger SLM is used. In these cases all of the useful light emitted by a pinpoint light source is able to enter the eye, after passing through the active area of the SLM. This limitation to extremely small SLM size can be mitigated by using an array of pinpoint light sources to rear illuminate the SLM.

Array of Pinpoint Light Sources

Figure 4:
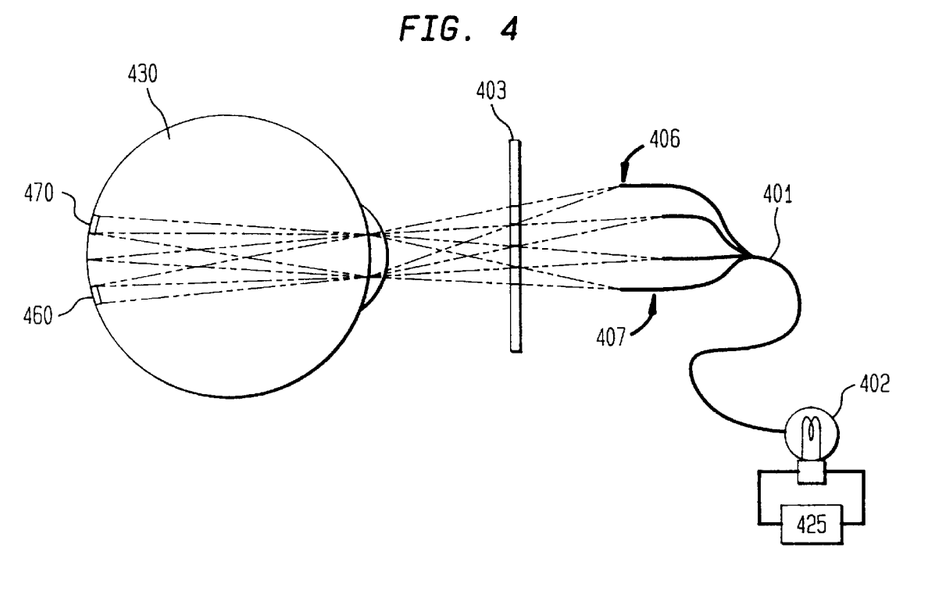
FIG. 4 depicts an array of pinpoint light sources in accordance with another aspect of the present invention.
Figure 4A:
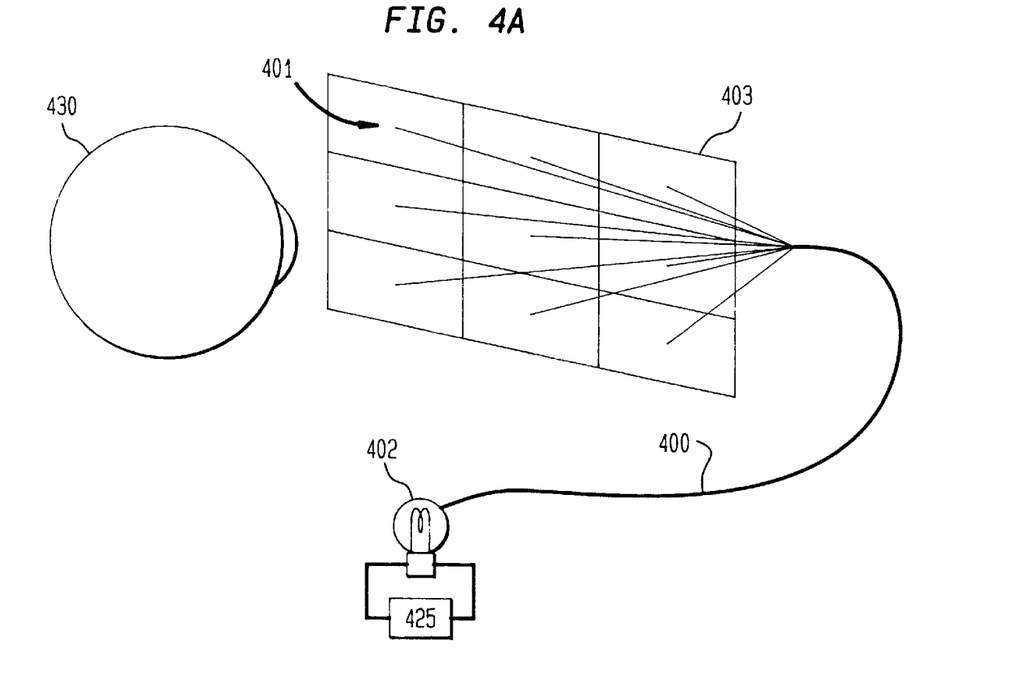
FIG. 4A is an oblique view of the pinpoint light source array shown in FIG. 4.

In the display system shown in side view in FIG. 4, (and shown obliquely in FIG. 4A) a larger SLM 403 is used to create an original image. A plurality of bright single point light sources 401 (the ends of separate fibers 400) are mounted in a spaced-out array behind the display. Fibers 400 can be end-illuminated in a bundle, by overall light-source 402 (illustratively an incandescent light bulb powered by power source 425), and in a manner analogous to the single point-source illuminator SLM technique. The end of each of the fibers 400 then separately illuminates contiguous small patches of SLM 403.

The spacing of these single point or point sources 401 is selected so that the retinal images formed by each point-source SLM-patch, when viewed by the human eye 430 from a fixed and short distance from the front of the overall imaging system, abut with the images from adjacent point-source SLM-patch areas so that there are no gaps in the imaged area of SLM 403. This spacing will vary based on various design tradeoffs of the constructed system (SLM and point-source distance from the eye, etc.).

As may be noted from FIG. 4, and in a manner analogous to the single fiber case described earlier, each of the individual image patches generated by the system will be upside down and reversed left to right. In addition, the separate image pieces are transposed about the vertical and horizontal axes. This is because the topmost fiber 406 for instance, generates the bottom-most image 460 on the surface of the retina while the bottom-most fiber 407 generates the topmost image 470. In order to produce a correctly reading aggregate image, the image to be produced on the SLM can be initially applied to a digital video frame store device. That device, as is well known in the prior art, can perform the required pre-transposition of the image to be displayed, so that after this processing the image is right reading.

Figure 4B:
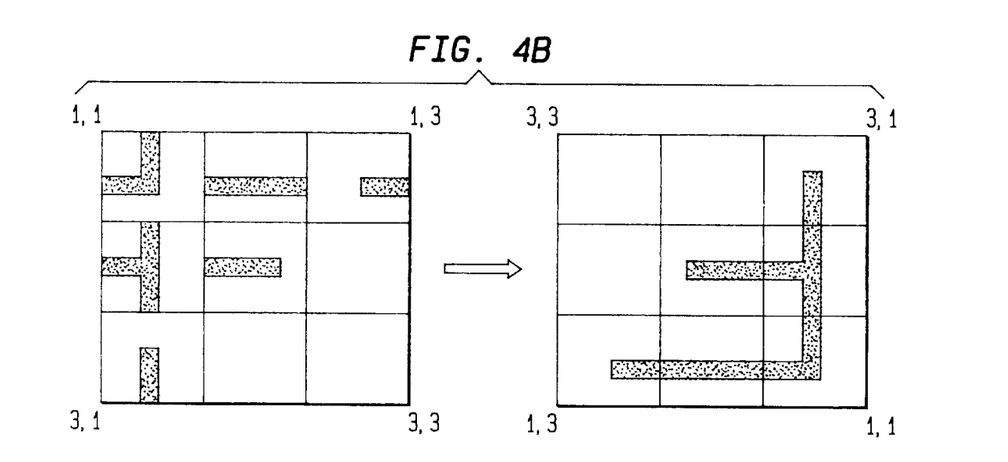
FIG. 4B illustrates an exemplar of a 3×3 light source and image patch array.

FIG. 4B illustrates the exemplar required image manipulations for a 3×3 light-source and image patch array. Each individual input image segment is transposed about its own axis and also traded for its diagonally opposite image segment. Here for instance segment 1,1 is inverted, and traded for its diagonally opposite segment 3,3 in the far lower right hand corner.

As can be noted from the FIG. 4, it is important to keep the eye at substantially a proper distance from the display. If the eye is placed too close to the display, the image will appear to break into segments since the overlap in the rays as shown in FIG. 4 will not be accomplished. If the eye is moved further back than is required, the eye will again see a disjoint image. In order to guarantee that the display is kept at the proper distance from each eye, a contoured face mount can be used as is well known in the art of head mounted displays.

Figure 4C:
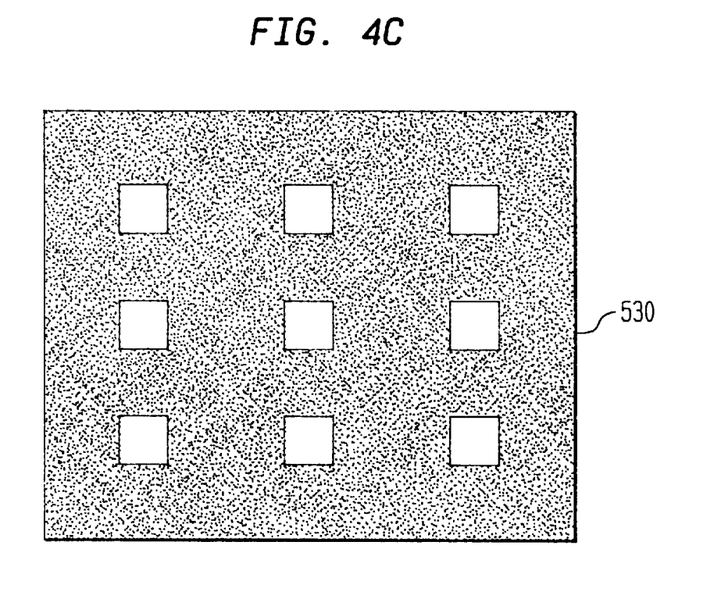
FIG. 4C illustrates a square-holed aperture mask that may be placed between the point light emitters and the SLM as shown in FIG. 4.
Figure 4D:
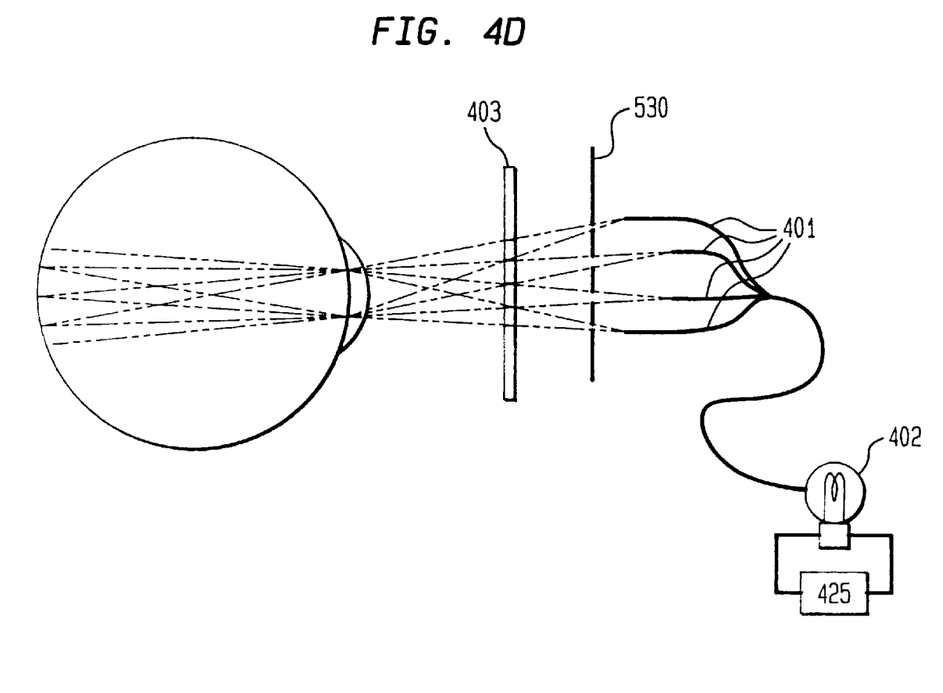
FIG. 4D depicts the operation of the square-holed aperture mask when placed between the point light emitters and the SLM.

In order to improve the system viewability, a square-holed aperture mask or plate 530 as shown in FIG. 4C can be applied between the array of point light emitters and the SLM as shown in side-view in FIG. 4D. Analogous portions of FIG. 4D and FIG. 4 are depicted with the same numbers. This aperture plate 530 in FIG. 4D makes the individual tiles of the image rectangular and makes them easier to assemble into a coherent overall image.

Point Source and Lens

Figure 5:
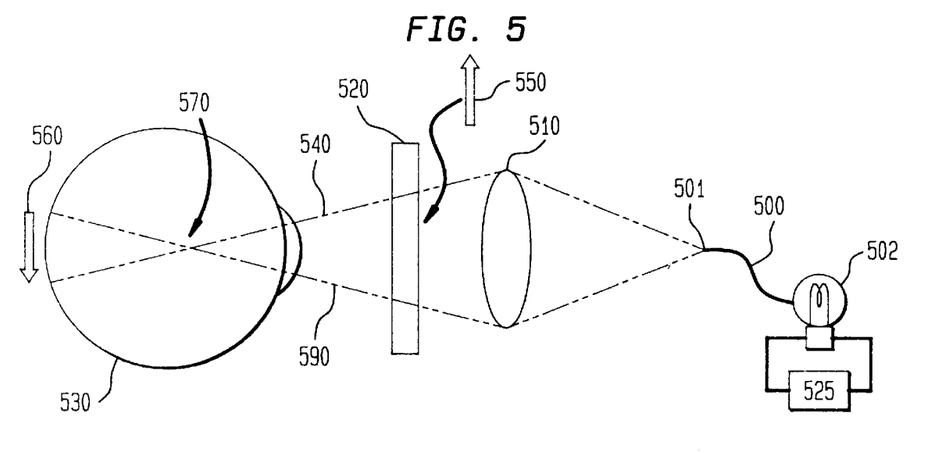
FIG. 5 depicts a single point source imaging system having a converging lens in accordance with another aspect of the present invention.

FIG. 5 depicts an alternative embodiment of a point source imaging system wherein a lens 510 is used to create converging rays from the nominally diverging rays leaving the point source. Point light source 501, the end of fiber 500, provides back illumination to SLM 520 which is displaying "up" arrow 550. Rays 540 and 590 enter the eye and cross over at a point 570. This point need not be the back focal point of the eye. Since the image of the SLM's up-arrow 550 is inverted to form retinal image 560, the SLM arrow will appear to be right-side up as is the case for viewing real world objects.

Figure 5A:
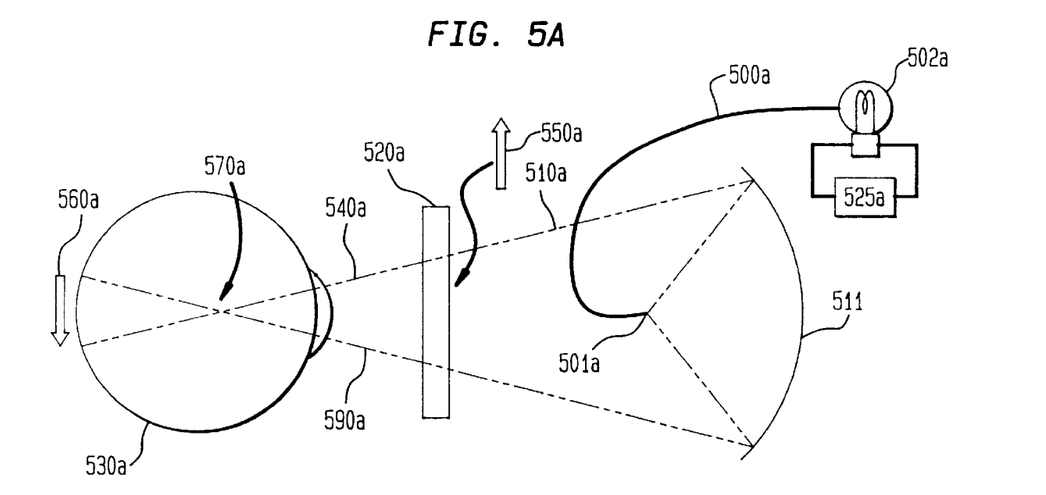
FIG. 5A depicts a single point source imaging system having a concave mirror in accordance with another aspect of the present invention.

FIG. 5a depicts an alternative embodiment of a point source imaging system wherein a concave mirror is used to create converging rays from the nominally diverging rays leaving a point source. Point light source 501a, the end of fiber 500a provides back illumination to SLM 520a which is displaying "up" arrow 550a. Rays 540a and 590a enter the eye and cross over at a point 570a. This point need not be the back focal point of the eye. Since the image of the SLM's up-arrow 550a is inverted to form retinal image 560a, the SLM arrow will appear to be right-side up as is the case for viewing real world objects.

Figure 6:
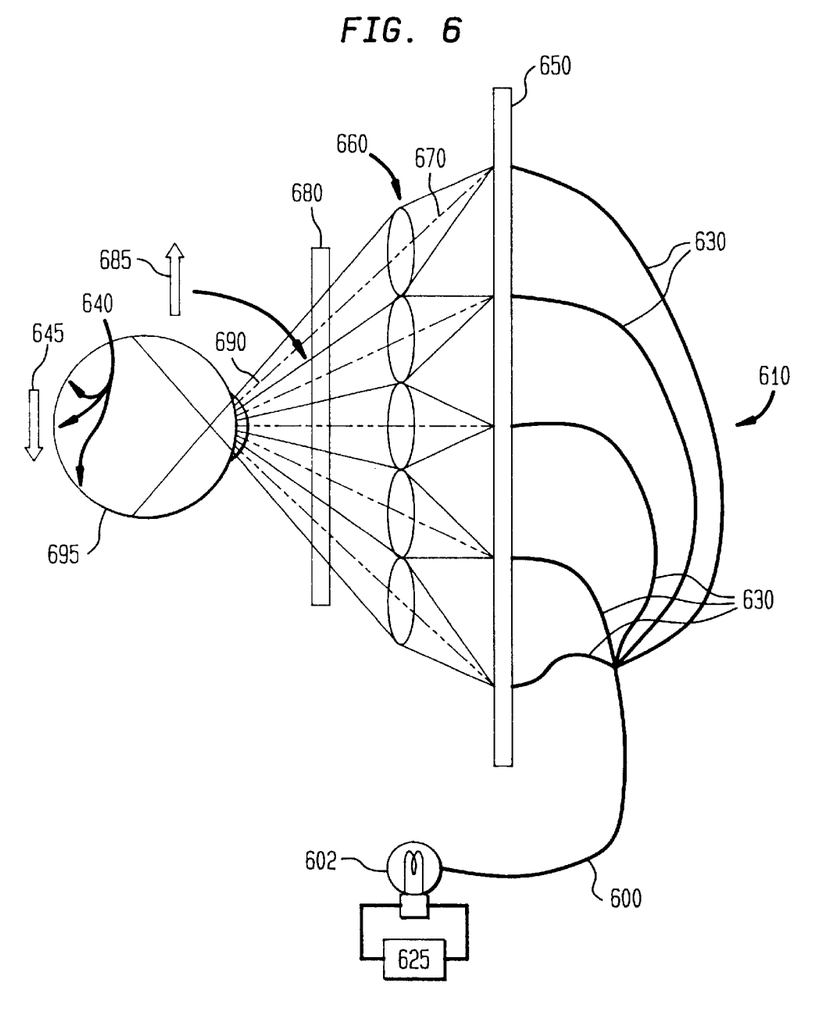
FIG. 6 depicts an imaging system having a point source array and a lens array in accordance with another aspect of the present invention.

FIG. 6 depicts in a side view, a preferred embodiment of the invention. Bright light source 602, illustratively a small incandescent light bulb powered by power source 625 provides light for the overall display system.

Each separate fiber 610 from illuminated bundle 600 is routed to a spaced out array position behind a lens array 660 and held in place by fiber alignment plate 650.

Figure 6A:
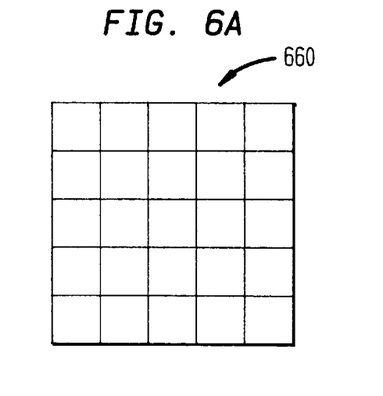
FIG. 6A illustratively depicts a close-packed lens array employed in FIG. 6 in accordance with another aspect of the present invention.

Close-packed lens array 660 (also shown face-on in FIG. 6A) focuses light from each of the fiber ends 630 into a converging set of ray bundles 690. Each of the ray bundles 690 abut at their edges with the ray bundles from each of the other lens elements in the array, creating a solid-packed set of bundles.

Light from the converging ray bundles passes through spatial light modulator 680 where the individual rays are modulated with the image 685 displayed on the SLM. The converging rays 690 then enter the eye 695 to form an enlarged virtual image 645 of the spatial modulator on retina 640. The spatial modulator position is flexible in that if it is moved closer to the eye, the apparent magnification of the image increases, however, a smaller portion of the spatial light modulator which actually passes light from the array is imaged. Conversely, if the SLM is moved further away from the eye, the apparent size of the image decreases, but more of the SLM's surface is imaged. In each of these cases, SLM 680 remains in focus to the eye since the light rays from the array generate unique non-overlapping image representations on the retina. Note that in this case, the image is portrayed upside down on the retina, causing a right-reading and non-inverted (e.g. normal) image impression in the brain of the user. In this case, no electronic, or other, image processing need be implemented to view the display properly.

Alternative Embodiment Using Light Sources other than Fiber Ends

Figure 7:
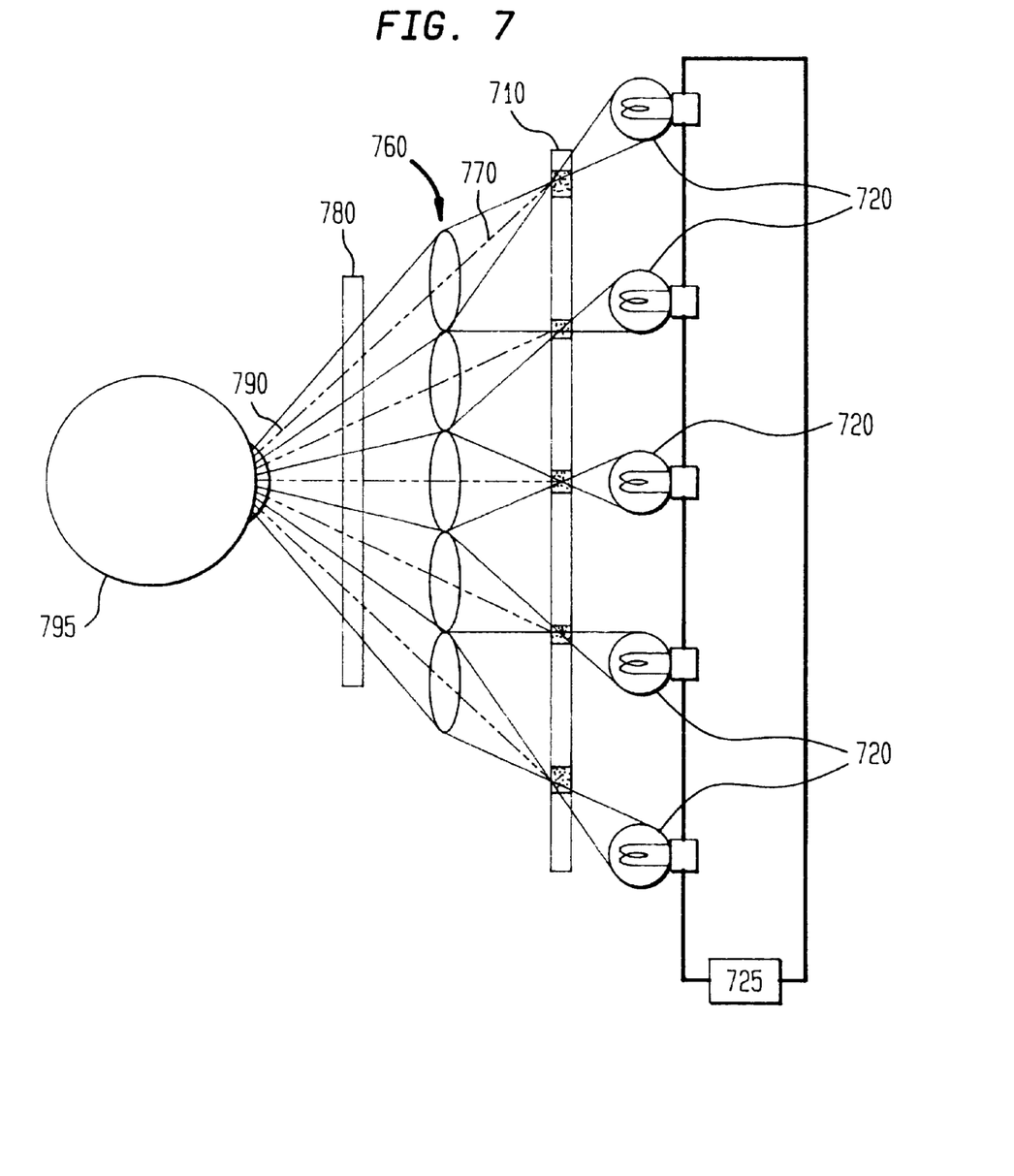
FIG. 7 depicts an imaging system having a discrete bright light source mounted behind a lens array in accordance with another aspect of the present invention.

In an alternative embodiment of the invention shown in FIG. 7, fiber-delivered light from a single source is replaced by a discrete bright light source mounted behind each lens of the array. Suitable light sources may be the active elements of light emitting diodes, ultra-miniature incandescent lamps, or other sources of point light. In the case where the actual light source is not sufficiently small so as to act as a point source of light, a pin-hole aperture array 710 may be employed, with a single aperture in front of each light source so as to cause it to conform to these requirements. In FIG. 7, light sources 720, illustratively miniature incandescent lights are apertured by pinhole aperture array 710. From here on, the operation of the virtual imaging display is analogous to what is shown in FIG. 4 for lenseless displays and FIG. 6 for lensed displays.

Alternatively, pinpoint light sources generated from the face of a Cathode Ray Tube can be used which would allow the point sources of light behind the lenses to be moved to provide eye tracking, (since the apparent position of the exit pupil of the system would move as all of the light sources moved.)

Finally, a planar optical array, holographic array, or other sources of point light can be used.

The described displays in the case of the array embodiments achieve short focal length since, in a typical virtual imaging display, the lenses used are large in diameter (near the size of the spatial light modulator to be imaged) and have focal lengths substantially equal to their diameter. Thus, if one considers a display needed to image a typical LC SLM used in today's head-mounted displays which might be approximately 2 inches across its widest dimension, a typical head mounted display using an fl optical system will be of thickness approximately 4 inches.

By using an array of lenses as I teach in this invention, the focal length of the individual element lenses in the lens-array determine the thickness of the overall display. If a 2 by 2 lens optical array is used, with "fl" lenses, the overall thickness of the display is divided by 2 (since the diameter of the lenses is divided by 2). A 3×3 array cuts the thickness to ⅓ etc. The actual number of lenses to be used can be traded off against the complexity of supplying light to each element in the array, and any other array fabrication issues.

The above description is exemplary of my invention. Numerous modifications and variations may be made by those skilled in the art without departing from the scope and spirit of my invention.

What is claimed is:

1. An apparatus for displaying a planar image having points on a human eye, said apparatus comprising:

a light source having rays of light; and a spatial light modulator interposed between said light source and the eye so that each of said light source rays transmits only a single point of the image through said spatial light modulator onto the eye.

2. The apparatus in accordance with claim 1 wherein said light source comprises an optical fiber having a first and a second end, said optical fiber first end being illuminated by light from a light emitter, said light being emitted from said optical fiber second end so as to illuminate said spatial light modulator.

3. The apparatus in accordance with claim 1 further comprising a lens interposed between said light source and said spatial light modulator so as to converge said light source rays onto said spatial light modulator.

4. The apparatus in accordance with claim 1 wherein said light source comprises an array of optical fibers, each fiber in said fiber array having a first and a second end, said first end being illuminated by light from a light emitter, said apparatus further comprising:

a fiber alignment plate that is interposed between said light source and said spatial light modulator, said fiber alignment plate holding each of said fiber second end in place; and a closed packed lens array interposed between said fiber alignment plate and said spatial light modulator, said closed packed lens array focusing each of said light source rays emitted from each of said fiber second end into a converging set of ray bundles, the converging set of rays illuminating said spatial light modulator.

5. The apparatus in accordance with claim 1 wherein said spatial light modulator is a photographic slide.

6. The apparatus in accordance with claim 1 wherein said spatial light modulator is a liquid crystal display.

7. The apparatus in accordance with claim 1 wherein said light source comprises an array of optical fibers, each fiber in said fiber array having a first and a second end and spaced so that the images formed when viewed by the eye abut with the images from adjacent fibers, each of said optical fiber first end being illuminated by light from an incandescent lamp, said incandescent lamp light emitted from said optical fiber second end illuminating said spatial light modulator.

8. The apparatus in accordance with claim 7 further comprising a square-holed aperture mask that is applied between said optical fiber array and said spatial light modulator.

9. The apparatus in accordance with claim 1 wherein said light source comprises a plurality of discrete light sources, and said apparatus further comprising:

a closed packed lens array interposed between said plurality of discrete light sources and said spatial modulator, said closed packed lens array focusing said light source ray bundles emanating from each of said plurality of discrete light sources into a converging set of ray bundles the converging set of rays illuminating said spatial light modulator.

10. The apparatus in accordance with claim 9 further comprising a pin-hole aperture interposed between said plurality of discrete light sources and said lens array, said pin-hole aperture having a single aperture in front of each of said plurality of discrete light sources so that each of said plurality of discrete light sources acts as a point source of light.

11. The apparatus in accordance with claim 9 wherein said plurality of discrete light sources comprises a planar optical array.

12. An apparatus for displaying an image having points on a human eye, said apparatus comprising:

a concave mirror;

a spatial light modulator interposed between said concave mirror and the eye; and a light source having a ray bundle, said light source being interposed between said concave mirror and said spatial light modulator so that the light emanating from said light source is reflected by said concave mirror so that each ray of said bundle transmits only a single image point through said spatial light modulator onto the eye.

13. A method for displaying a planar image of an object on an eye, said method comprising the steps of:

illuminating the image with a bundle of rays of light from a light source to produce an illuminated image;

modulating individual rays of light of the illuminated image with a spatial light modulator; and transmitting the modulated individual rays of light to the eye.

14. The method of claim 13, wherein said illuminated image is in-focus at the eye independent of the distance of the objective from the eye.

\* \* \* \* \*